(12) United States Patent
Nock

(10) Patent No.: US 6,832,228 B1
(45) Date of Patent: Dec. 14, 2004

(54) APPARATUS AND METHOD FOR PROVIDING A THREADSAFE OBJECT POOL WITH MINIMAL LOCKING

(75) Inventor: Clifton Malcolm Nock, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/422,388

(22) Filed: Oct. 21, 1999

(51) Int. Cl.[7] .............................................. G06F 17/00
(52) U.S. Cl. ............................ 707/103 R; 707/104.1; 707/102.1; 707/10; 717/128; 717/140
(58) Field of Search .............................. 707/1–10, 103, 707/104, 205

(56) References Cited

U.S. PATENT DOCUMENTS

| | | | | |
|---|---|---|---|---|
| 5,615,326 A | * | 3/1997 | Orton et al. ................. | 345/807 |
| 5,727,203 A | * | 3/1998 | Hapner et al. ............... | 707/103 |
| 5,771,382 A | * | 6/1998 | Wang et al. ................. | 718/100 |
| 5,826,082 A | * | 10/1998 | Bishop et al. ............... | 718/100 |
| 5,940,827 A | * | 8/1999 | Hapner et al. ................ | 707/8 |
| 6,240,498 B1 | * | 5/2001 | Dickes et al. ............ | 707/103 R |
| 6,519,605 B1 | * | 2/2003 | Gilgen et al. ........... | 707/103 R |

* cited by examiner

Primary Examiner—Jean M. Corrielus
Assistant Examiner—Anh Ly
(74) Attorney, Agent, or Firm—Martin & Associates, LLC; Derek P. Martin

(57) ABSTRACT

A threadsafe object pool in accordance with the preferred embodiments reserves each object for a particular thread of execution. Locking of an object pool is normally required to assure that two threads cannot simultaneously request the same object. However, because each object in the pool is reserved for a single thread, no other threads will be allowed to access the object, so the locking of the pool to prevent simultaneously allocating an object to two different threads is not required.

21 Claims, 8 Drawing Sheets

```
/******************************************************************
Code to get an object from the pool.
******************************************************************/
Object o;    502

// Let t be a consistent representation of the current thread.
Thread t = Thread.currentThread();    504
// If the pool contains an entry for the current thread, then look in it.
// (The entry is a Vector, which in Java is a simple list of objects)
if (POOL.containsKey(t)    506
{
        Vector v = (Vector)POOL.get(t);    508
        // If the list contains an unused object, then remove it from the pool and use it.
        // No synchronization is necessary, since only one thread accesses it.
        if (v.size() > 0)    510
        {
                o = v.elementAt(0);         512
                v.removeElementAt(0);    514
        }
        // If the list does not contain any unused objects, then create a new one.
        else
        {
                o = new Object();    516
        }
}
// Otherwise, if an object has never been requested by this thread (i.e., this is
// the first time), then create a new one, and store it in the pool for future use.
else    520
{
        Vector v;    522
        // First, check to see if there are any dead thread objects. If we find one,
        // then just use its entry and remove its entry from the hash table.
        // Synchronization is necessary to keep multiple threads from finding the
        // same dead thread object.
        synchronized (POOL)    524
        {
                Enumeration enum = POOL.keys();    530
                while (enum.hasMoreElements())    532
                {
                        Thread key = (Thread) enum.nextElement();    534
                        if !key.isAlive()    536
                        {
                                v = (Vector) POOL.get(key);    540
                                POOL.remove(key);              542
                                break;                                       544
                        }
                }
        }
}
(continued in FIG. 6)
```

FIG. 5

(continued from FIG. 5)

```
// If no dead thread was found, then create a new entry.
if (v == null)            550
    v = new Vector();     552

// Add an entry for this list to the hash table.
POOL.put(t, v);           554

// If the list contains an unused object, then remove it from the pool and
// use it.  No synchronization is necessary, because only one thread
// accesses it.
if (v.size() > 0)         560
{
    o = v.elementAt(0);       562
    v.removeElementAt(0);     564
}

// If the list does not contain any unused objects, then create a new one.
else        566
{
    o = new Object();     568
}
}
```

FIG. 6

```
/*****************************************************************************
Code to return an object to the pool.
*****************************************************************************/

// v and o are still assigned.

v.addElement(o);    710
```

FIG. 7

```
/*******************************************************************
Code to get an object from the pool.
*******************************************************************/
Object o;    900

// Let t be a consistent representation of the current thread.
Thread t = Thread.currentThread();    904

// If an object was previously requested by this thread, then reuse it.
if (POOL.containsKey(t)    906
{
        o = POOL.get(t);    908
}

// Otherwise, if an object has never been requested by this thread (i.e., this is
// the first time), then create a new one, and store it in the pool for future use.
else    920
{
        // First, check to see if there are any dead thread objects. If we find one,
        // then just use its entry and remove its entry from the hash table.
        // Synchronization is necessary to keep multiple threads from finding the
        // same dead thread object.
        synchronized (POOL)    924
        {
                Enumeration enum = POOL.keys();    930
                while (enum.hasMoreElements())    932
                {
                        Thread key = (Thread) enum.nextElement();    934
                        if (!key.isAlive())    936
                        {
                                o = POOL.get(key);    940
                                POOL.remove(key);    942
                                break;    944
                        }
                }
        }

// If no dead thread was found, then create a new object.
        if (o == null)    950
                o = new Object();    952

// Add an entry for this object to the hash table.
        POOL.put(t, o);    954
```

FIG. 9

APPARATUS AND METHOD FOR PROVIDING A THREADSAFE OBJECT POOL WITH MINIMAL LOCKING

BACKGROUND OF THE INVENTION

1. Technical Field

The present invention relates in general to the data processing field. More specifically, the present invention relates to object oriented computer programming techniques.

2. Background Art

Since the dawn of the computer age, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

When an object is created in an object oriented system, it is created as an instance of a particular class. Object oriented languages typically define methods on a class that create and delete objects when the methods are invoked. The creation of an object typically involves two operations: 1) allocating storage for the object, and 2) invoking the constructor method on the class, which creates the instance of the class in the allocated storage.

Most object oriented computer systems include a "heap", which is a relatively large storage area that may be allocated in smaller pieces as needed. In the prior art, when an object needs to be created, a storage element must typically be retrieved from the heap. The object can then be created using the storage element. However, the act of retrieving storage from the heap generally takes a relatively long time, resulting in substantial performance penalties when a storage element is allocated for an object. Furthermore, accesses to storage elements must be serialized on multi-threaded systems. Serializing access to storage elements assures that one storage element cannot be allocated to two different threads. Serialization is accomplished using a locking scheme. When one thread is accessing the heap, other threads are locked out, effectively serializing the access of threads that desire simultaneous access. Without locking, it would be possible for two threads to check the heap and determine that the same storage element is available, but the storage element can only be allocated to one of the threads. Serialization is the technique used to assure that a storage element can only be allocated to one thread.

Modern object oriented programming languages have features that improve the convenience of programming in those languages. For example, the Java programming language developed by Sun Microsystems has a garbage collection feature that automatically returns unused objects to the heap. Automatic garbage collection has the advantage of reducing the complexity of the code because explicit code to return objects to the heap is not required. However, this advantage comes at a cost in performance and flexibility. Allocating an object from the heap is a relatively expensive process in terms of computer resources. By automatically returning old objects to the heap during garbage collection, a storage element must be re-allocated from the heap as each new object is created. One way to overcome part of the performance penalty of automatic garbage collection is to create groups of objects known as object pools (or storage pools) that are still in use as far as the garbage collection mechanism is concerned, but are actually not used. When a new object is needed, one of these objects in the pool can be returned without going to the heap to allocate a new storage element. Pools thus provide one way to "recycle" used objects in a way that provides significant performance benefits. However, using object pools requires that serialization methods must still be employed to assure that an object in the pool is allocated to only one thread. While object pools enhance the performance of an object oriented program that has automatic garbage collection, this enhancement is reduced by the serialization techniques used to access the object pool. Without a mechanism for allowing different threads to access an object pool simultaneously, the computer industry will continue to suffer performance penalties in object oriented programs that use object pools due to the serialization of accesses to the object pool.

DISCLOSURE OF INVENTION

A threadsafe object pool in accordance with the preferred embodiments reserves each object for a particular thread of execution. Locking of an object pool is normally required to assure that two threads cannot simultaneously request the same object. However, because each object in the pool is reserved for a single thread, no other threads will be allowed to access the object, so the locking of the pool to prevent simultaneously allocating an object to two different threads is not required.

The foregoing and other features and advantages of the invention will be apparent from the following more particular description of preferred embodiments of the invention, as illustrated in the accompanying drawings.

BRIEF DESCRIPTION OF DRAWINGS

FIGS. 5-7 show pseudo-code for implementing a method for the object pool shown in FIG. 4 in accordance with the preferred embodiments;

FIG. 9 shows pseudo-code for implementing a method for the object pool shown in FIG. 8 in accordance with the preferred embodiments.

BEST MODE FOR CARRYING OUT THE INVENTION

Figure 1:
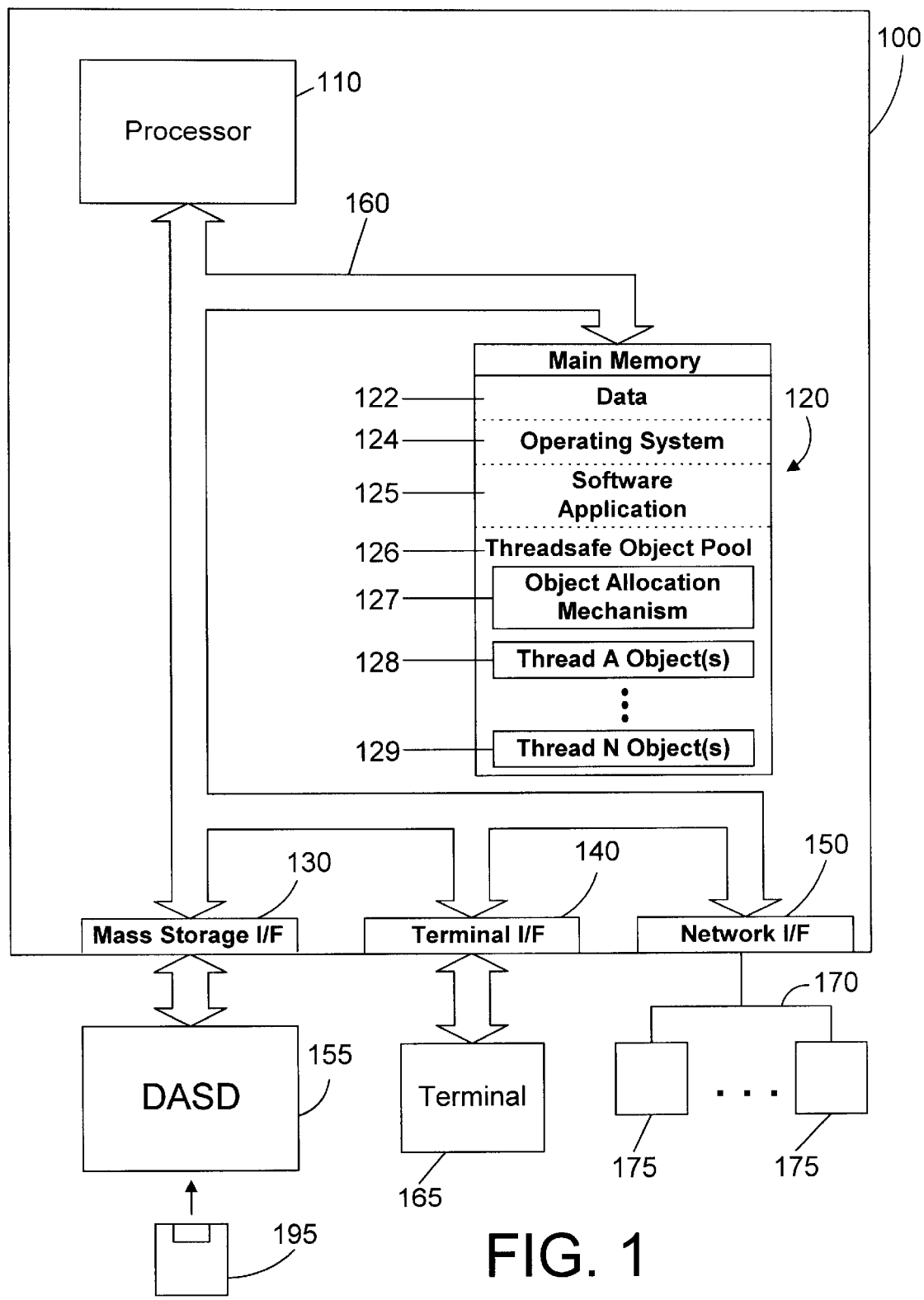
FIG. 1 is a block diagram of a computer apparatus in accordance with preferred embodiments of the present invention.

The present invention is accomplished through the use of object oriented programming concepts. For those who are not familiar with object oriented programming concepts, the brief overview below provides background information that will help the reader to understand the present invention.
1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Multi-threaded Computer Systems

Many modern computer systems provide a multi-process environment, which allows the computer system to execute multiple processes in parallel. One specific type of computer system that is capable of executing multiple processes is known as a multi-threaded computer system. In a multi-threaded computer system, multiple threads of control are available to the operating system. The operating system assigns different threads to different processes. Because an object may be accessed by multiple threads, serialization (i.e., locking) techniques were developed to assure that only one thread can access objects in a storage pool at a time.

Prior Art Method for Serializing Access to a Storage Pool

Figure 2:
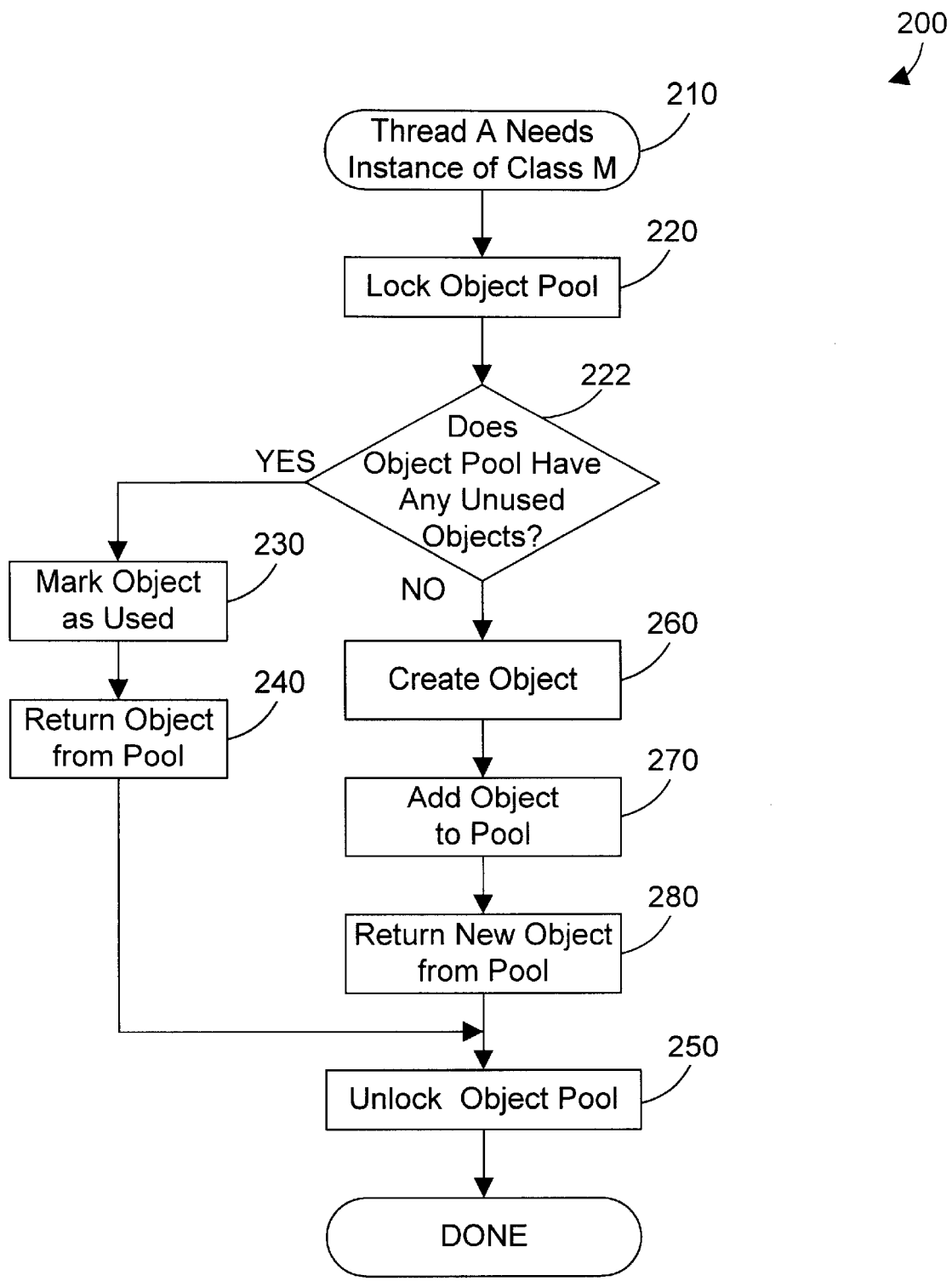
FIG. 2 is a flow diagram of a prior art method for accessing objects in an object pool.

Referring to FIG. 2, a known method 200 for serializing accesses to a storage pool is shown. When a thread needs an instance of a particular class, it goes to the pool for that class (step 210). Method 200 in FIG. 2 assumes that a pool contains only instances of a single class. Before accessing the pool, the current thread -locks the pool (step 220) to prevent other threads from accessing the pool at the same time. One known way to lock a pool uses a "synchronize" instruction in the Java programming language, which assures that only one thread at a time is executing the code protected by the synchronize instruction. Next, if the pool has any unused objects (step 222=YES), one of the unused objects is marked as used (step 230), and that object is returned from the pool (step 240). If the pool has no unused objects (step 222=NO), a new object is created (step 260), added to the pool (step 270), and returned from the pool (step 280). Once an object is returned from the pool in step 240 or step 280, the pool is unlocked (step 250) so that other threads can access the pool as needed.

Locking the pool in step 220 and unlocking the pool in step 250 results in the pool being locked for a relatively long period of time, especially if step 222=NO, and a new object has to be created by obtaining a storage element from the heap in step 260. The preferred embodiments described below provide a way for multiple threads to access the pool simultaneously with only minimal locking, which improves performance of the computer program.

DETAILED DESCRIPTION

According to preferred embodiments of the present invention, an apparatus and method provide a threadsafe object pool by reserving each object in the pool for a particular thread of execution. When a thread requests an object from the pool for the first time, a new object is created, reserved for the thread, placed in the pool, and returned to the thread. When the thread has finished using the object, it is again available in the pool. The next time the same thread needs an object from the pool, this same object will be returned to the thread. Reserving each object in the pool to a particular thread of execution assures that no two threads can access any single object in the pool at the same time. Minimal locking may still be required to re-use objects that are reserved for dead threads, but this locking is much less frequent than the locking of the entire pool that is done in the prior art each time the pool is accessed.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multiuser computing apparatus. a single user workstation, or an embedded control system. As shown in FIG. 1, computer system 100 comprises a processor 110, a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 122, an operating system 124, a software application 125, and a threadsafe object pool 126. Object pool 126 includes an object allocation mechanism 127, and one or more objects that are each reserved for a different thread of execution. Object(s) 128 in FIG. 1 represent one or more objects that are reserved for thread A. Object(s) 129 in FIG. 1 represent one or more objects that are reserved for thread N. Object pool 126 may include any suitable number of objects for any suitable number of threads. A significant difference over prior art object pools is that each object in pool 126 is reserved for a single thread of execution.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, software application 125, and object pool 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as AS/400; however, those skilled in the art will appreciate that the spirit and scope of the present invention is not limited to any one operating system. In the preferred embodiments, software application 125 is object oriented or object based, and requires object oriented objects during its execution. Performance is improved when these objects may be allocated from the object pool 126 instead of retrieving a storage element from the heap.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 3:
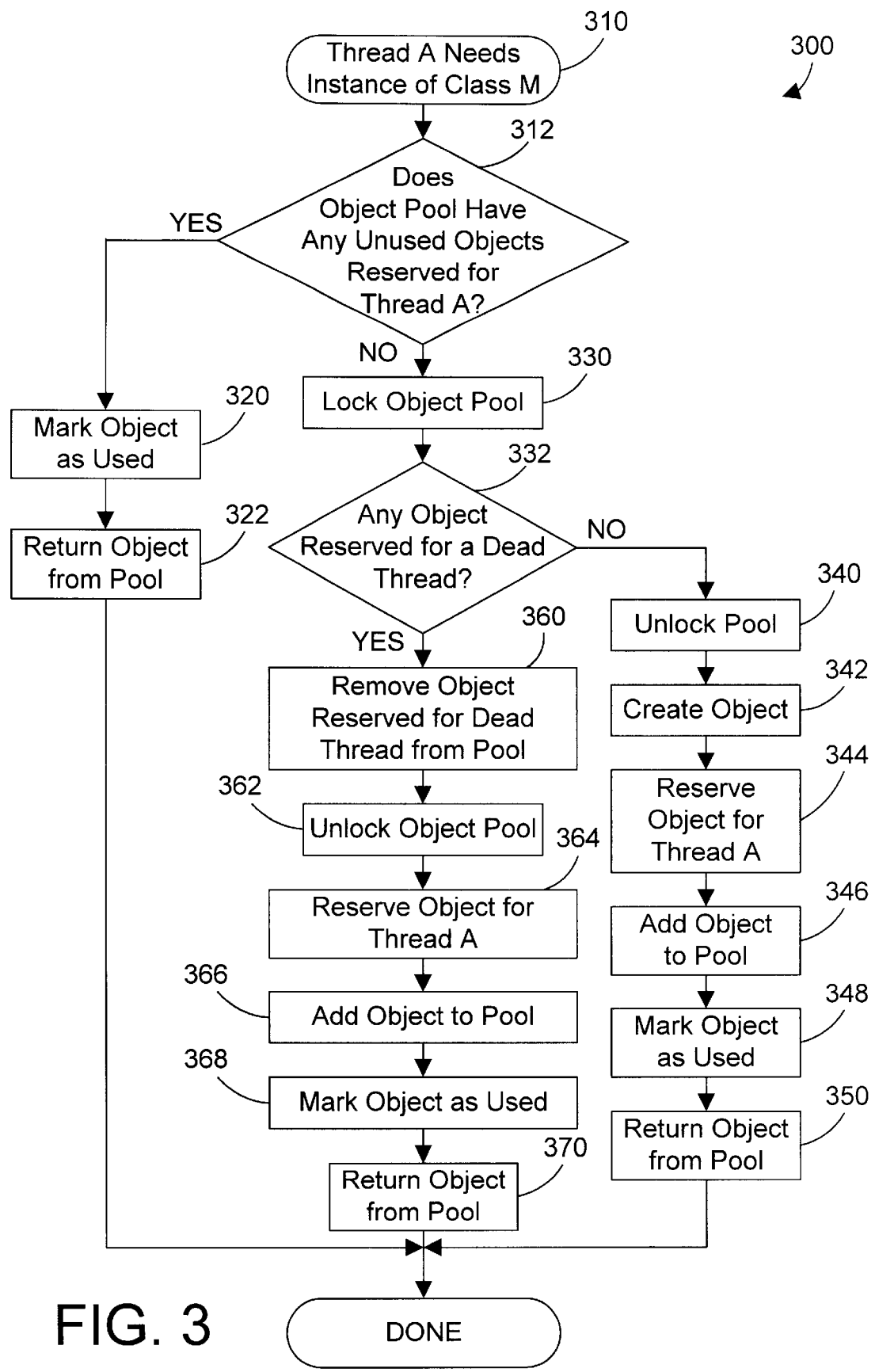
FIG. 3 is a flow diagram of a method for accessing objects in an object pool in accordance with the preferred embodiments.

Referring now to FIG. 3, a method 300 represents steps that are suitably performed by the object allocation mechanism 127 of FIG. 1. We assume for the purpose of illustration that object pool 126 is a pool of instances of a class. Thus, an object pool corresponds to a single class, and when the software application needs an instance of that class, it requests an instance from the corresponding object pool. The starting point for method 300 is that a thread (arbitrarily called "thread A") needs an instance of some class (arbitrarily called "class M") (step 310), where class M represents the class whose instances are stored in the object pool. First, method 300 determines whether the object pool has any unused objects reserved for thread A (step 312). If so (step 312=YES), the object in the pool that is reserved for thread A is marked as used (step 320) and is returned from the pool to thread A (step 322). If the pool does not have any unused objects that are reserved for thread A (step 312=NO), the object pool is then locked (step 330) in order to check whether there are any objects in the pool that are reserved for a thread that is now dead (step 332). If there is no object in the pool that is reserved for a dead thread (step 332=NO), the pool is unlocked (step 340), a new object is created (step 342), the new object is reserved for thread A (step 344), the new object is added to the pool (step 346), the new object is marked as used (step 348), and the new object is returned to thread A (step 350). If, however, there is an object in the pool that is reserved for a dead thread (step 332=YES), the object reserved for the dead thread can be recycled and used for thread A by performing steps 360–372. First, the object that is reserved for the dead thread is removed from the pool (step 360). The object pool is then unlocked (step 362). The object that was removed from the pool in step 360 is then reserved for thread A (step 364). The object is then added back to the pool (step 366), marked as used (step 368), and returned to thread A (step 370).

Locking the object pool in method 300 of FIG. 3 is still required to assure that two different threads do not try to obtain the same object that is reserved for a dead thread in step 332. However, this locking is very minimal, and only occurs when a thread finds there are no unused objects in the pool that are reserved for it. The locking in the prior art method 200, in contrast, locks out accesses to the pool each time the pool is accessed. In FIG. 3, once the pool is initialized, the path through steps 310, 312, 320, and 322 will be the most commonly-executed path, and this path has no locking at all. The performance penalties of serializing accesses to a storage pool in the prior art are therefore significantly reduced for the minimal locking that is performed in the preferred embodiments.

Figure 4:
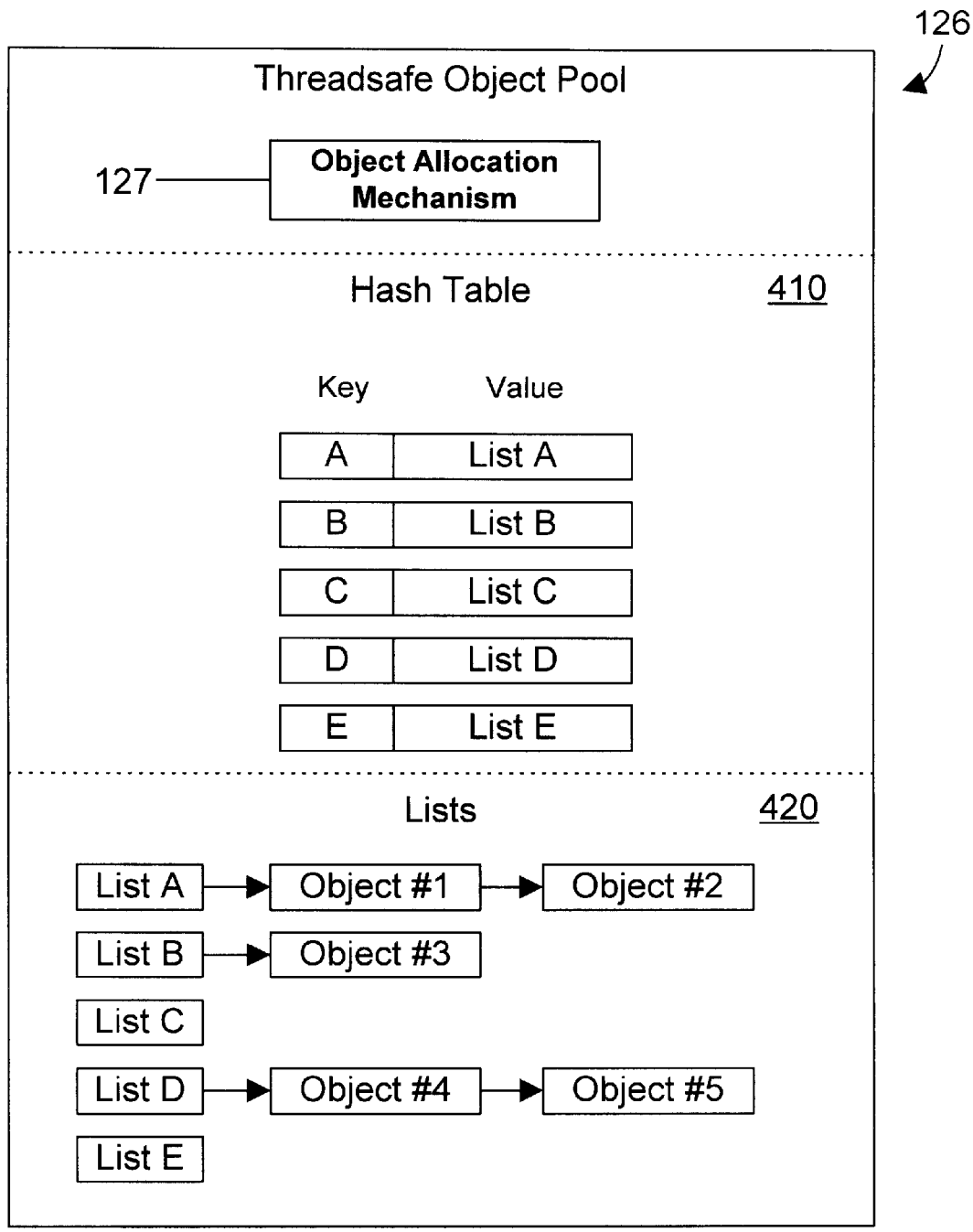
FIG. 4 is a block diagram of one specific embodiment for the object pool 126 of FIG. 1.

Referring now to FIG. 4, one specific implementation of a threadsafe object pool 126 includes an object allocation mechanism 127 that uses a hash table 410 that has a key corresponding to the thread for which the object is reserved, and a value that corresponds to a list of objects that are available for that thread. Sample lists are shown at 420 in FIG. 4. List A includes two objects, Object #1 and Object #2. List B includes one object, Object #3. List C is an empty list containing no objects. List D includes two objects, Object #4 and Object #5. List E is an empty list containing no objects.

FIGS. 5 and 6 show Java pseudo-code for getting an object from the pool 126 shown in FIG. 4. The vector in the pseudo-code refers to a list of objects, such as List A, List B, etc. An object "o" is defined in line 502 that is the object that will be returned to the requesting thread. The current thread is represented by the variable "t" in line 504. Next, code 500 checks at line 506 to see if there is a list in the pool's hash table with a key that corresponds to the current thread. If so, a vector "v" is assigned a value corresponding to the list for the thread (line 508). The term "vector" is a Java construct that is a simple list of objects, where each object is referred to as an element in the list, and each element in the list has a corresponding position in the list. Next, line 510 checks to see if the size of the vector just read in line 508 is greater than zero, which means that the list is not empty. If the list is not empty, object "o" is assigned the object at element zero of the list at line 512, and that object is then removed from the list at line 514. If the list is empty in line 510, new object is allocated to object "o" in line 516.

If the pool does not contain a list for the current thread, the if statement in line 506 is false, so execution continues with the else statement at line 520. In line 522, a variable "v" of type Vector is declared. The pool is then locked using the synchronized instruction at line 524. The synchronized instruction in Java only allows the portion of code that it protects to be executed by one thread at a time, thus serializing access to the code from line 530 to line 544. A variable "enum" is declared as an enumeration, and is assigned the value of the keys in the pool, which correspond to the threads that have lists of objects in the pool. The "while" statement at line 532 simply cycles through the enumeration of pool keys (i.e., threads) so that each thread is checked to see whether the thread is dead. Line 534 gets the next thread to be checked. Line 536 checks to see if the thread is still alive. If so, the while loop continues execution by getting the next thread at line 534 and checking to see if it's dead at line 536. If a dead thread is found, the if statement in line 536 is true, which causes the statements at lines 540, 542, and 544 to be executed. Line 540 assigns the list for the thread currently being considered by the while loop to "v", removes the list from the pool at line 542, and breaks at line 544. The break instruction at line 544 will break out of the while loop defined at line 532 once a dead thread has been located.

Referring to FIG. 6, execution of code 500 in FIG. 5 continues at line 550 of FIG. 6, which checks to see if "v" was ever assigned a value. This effectively checks to see if a list was ever identified in step 540 that was dead. If the if statement at line 550 is true, this means that no list for a dead thread was available in the pool, so a new list is needed. This new list is created at line 552. At this point the list is stored back into the pool at line 554. The statement at line 560 checks to see if the list is empty. If the list is not empty, the size of the vector is greater than zero, so the if statement at line 560 is satisfied and lines 562 and 564 are executed. At line 562, the first object on the list is assigned to "o", and the first object on the list is then deleted at line 564. If the list is empty, the if statement at line 560 is not satisfied, and the else statement at line 566 is executed instead, which results in "o" being assigned to a newly-generated object at line 568.

The pseudo-code of FIGS. 5 and 6 performs most of the steps in method 300 of FIG. 3. The pseudo-code does not explicitly address the issue of whether an object is used or unused, but we assume for the purpose of illustration that objects that are in use (i.e., used) are not part of the lists shown in FIG. 4 and referenced in the pseudo-code of FIGS. 5 and 6. In addition, with the hash table of FIG. 4 and the pseudo-code of FIGS. 5 and 6, note that the steps of reserving the object for a thread in step 364 and adding the object to the pool in step 368 are done simultaneously by adding the object to the pool (hash table of FIG. 4) with the appropriate key (corresponding to the thread). Similarly, steps 344 and 346 can be performed simultaneously by adding an object to the pool with the appropriate key.

FIG. 7 illustrates the pseudo-code for returning an object to the pool. The addElement instruction at line 570 adds object "o" back to the pool at vector "v". In this manner an object is easily returned to its corresponding list in the object pool 126.

Figure 8:
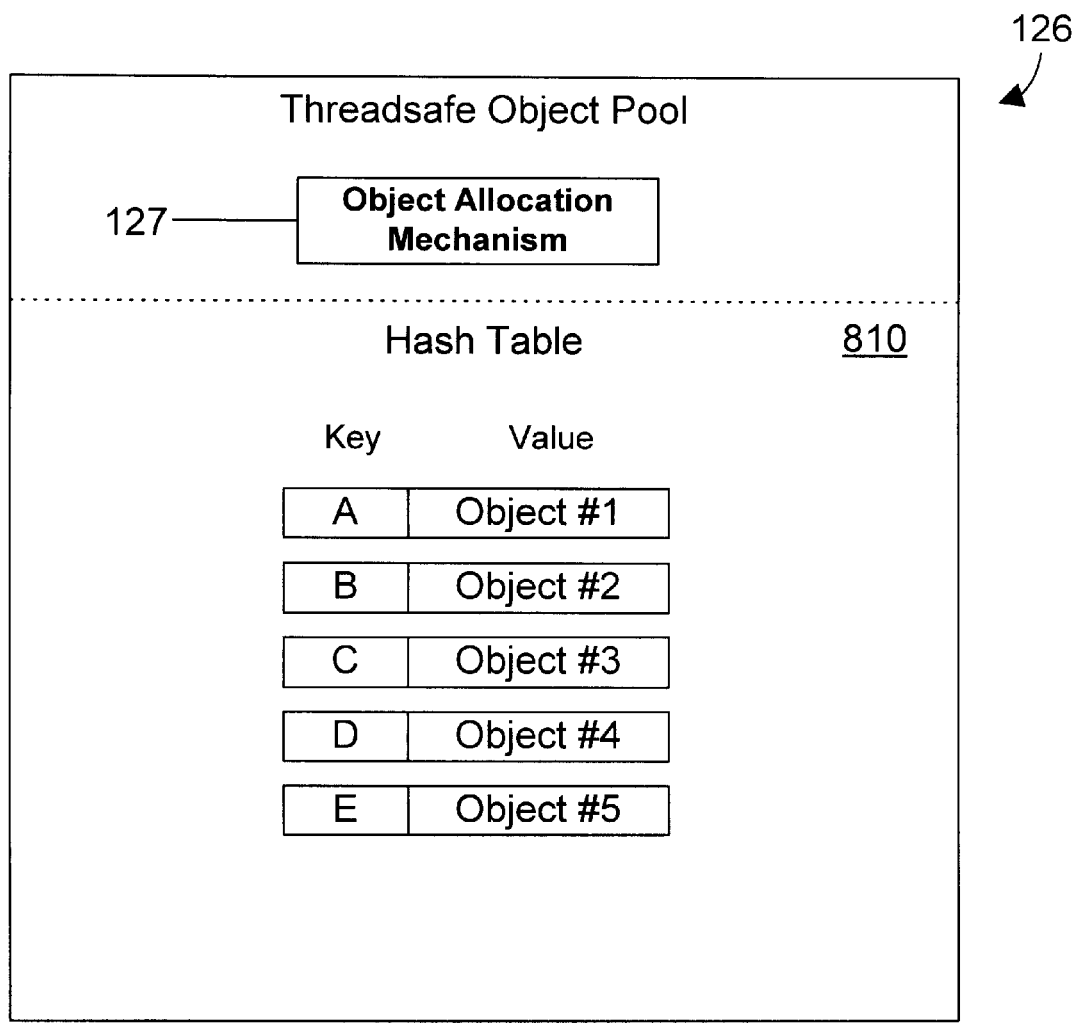
FIG. 8 is a block diagram of another specific embodiment for the object pool 126 of FIG. 1.

Making certain assumptions can simplify the pseudo-code needed to perform the functions of FIG. 3. Referring to FIG. 8, a second-specific implementation of a threadsafe object pool 126 includes an object allocation mechanism 127 and a hash table 810. Note that hash table 810 includes a key that corresponds to the thread, as in FIG. 4. However, the object pool of FIG. 8 assumes that a thread will only need one instance of a class at a time. Thus, if there is an entry in the hash table, this entry is assumed to be unused, and can be allocated to the requesting thread. Referring to FIG. 9, the code 900 is similar to the code 500 of FIGS. 5 and 6, but does not have to consider lists for each thread. Instead, each thread has at most a single object that may be available in the pool.

An object "o" is defined in line 902 that is the object that will be returned to the requesting thread. The current thread is represented by the variable "t" in line 904. Next, code 900 checks at line 906 to see if there is a list in the pool's hash table with a key that corresponds to the current thread. If so, object "o" is assigned at line 908 to the object that corresponds to the thread.

If the pool does not contain an object for the current thread, the if statement in line 906 is false, so execution continues with the else statement at line 920. The pool is locked using the synchronized instruction at line 924, which serializes access to the code from line 930 to line 944. A variable "enum" is declared as an enumeration, and is assigned the value of the keys in the pool, which correspond to the threads that have an object in the pool. The "while" statement at line 932 simply cycles through the enumeration of pool keys (i.e., threads) so that each thread is checked to see if there are any objects reserved for a dead thread. Line 934 gets the next thread to be checked. Line 936 checks to see if the thread is still alive. If so, the while loop continues execution by getting the next thread at line 934 and checking to see if it's dead at line 936. If a dead thread is found, the if statement in line 936 is true, which causes the statements at lines 940, 942, and 944 to be executed. Line 940 assigns the object corresponding to the dead thread to "o", line 942 removes the object from the pool, and line 544 is a break instruction that exits the while loop of line 932 once a dead thread has been located.

Next, line 950 checks to see if "o" has been assigned an object. If the if statement at line 950 is true, this means that no object was assigned to "o" at line 908 or at line 940, so a new object is needed. This new object is created at line 952. At this point the object is added to the pool at line 954.

The pseudo-code of FIG. 9 performs most of the steps in method 300 of FIG. 3. However, steps 320, 368, and 348 are not implemented in the pseudo-code because the assumption is made that a thread can only use one object at a time, so if the thread has an entry in the pool, it will have a corresponding object, making it unnecessary to check whether an object is used or not.

The preferred embodiments significantly reduce the performance penalty of locking prior art object pools by reserving objects for a particular thread. No thread can receive an object from the pool that is not reserved for it. Because no two threads can receive the same object, simultaneous access to the pool by two different threads is generally allowed. The minimal locking that is used in the preferred embodiments results in a much less significant performance penalty than serializing all accesses to the pool, as done in the prior art.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

I claim:

1. An apparatus comprising:
   (1) at least one processor;
   (2) a memory coupled to the at least one processor; and
   (3) an object pool residing in the memory, the object pool including:
      (3A) at least one object oriented object reserved for a first thread of execution; and
      (3B) at least one object oriented object reserved for a second thread of execution.

2. The apparatus of claim 1 further comprising a software application residing in the memory that is executed by the first thread of execution and that requests an object from the object pool.

3. The apparatus of claim 1 further comprising an object allocation mechanism that allocates an object oriented object to a software application that is executed by the first thread, wherein the object allocation mechanism (A) determines whether there is an object in the object pool that is reserved for the first thread, and if so, allocates the reserved object to the first thread; (B) if there is no object in the object pool that is reserved for the first thread, the object allocation mechanism creates a new object, reserves the new object for the first thread, adds the new object to the object pool, and returns the new object in the object pool to the first thread.

4. The apparatus of claim 3 wherein step (A) is performed only if there is no object in the object pool that is reserved for a dead thread.

5. The apparatus of claim 4 wherein the object allocation mechanism locks the object pool to prevent other threads from accessing the object pool when the first thread determines whether there is an object in the object pool that is reserved for a dead thread.

6. The apparatus of claim 4 wherein if there is an object in the object pool that is reserved for a dead thread, the object allocation mechanism performs the steps of:
   (C) reserving for the first thread the object that is reserved for the dead thread; and
   (D) returning the object reserved in step (C).

7. An apparatus comprising:
   at least one processor;
   a memory coupled to the at least one processor;
   an object allocation mechanism residing in the memory that allocates an object oriented object to a software application at the request of the software application, wherein the object allocation mechanism (1) determines whether there is an object in an object pool that is reserved for a first thread of execution, and if so, allocates the reserved object to the first thread; (2) if there is no object in the object pool that is reserved for the first thread, the object allocation mechanism creates a new object, reserves the new object for the first thread, adds the new object to the object pool, and returns the new object in the object pool to the first thread.

8. The apparatus of claim 7 further comprising a software application residing in the memory that is executed by the first thread of execution and that requests an object from the object pool.

9. The apparatus of claim 7 wherein the object pool resides in the memory, the object pool including:
   at least one object oriented object reserved for the first thread of execution; and
   at least one object oriented object reserved for a second thread of execution.

10. An apparatus comprising:
   (1) at least one processor;
   (2) a memory coupled to the at least one processor;
   (3) means for allocating an object oriented object in an object pool that is reserved for a first thread of execution to the first thread;
   (4) means for creating a new object;
   (5) means for reserving the new object for the first thread;
   (6) means for adding the new object to the object pool;
   (7) means for returning the new object in the object pool to the first thread;
   wherein the means in (3) allocates an object to the first thread if the object pool contains an object that is reserved for the first thread;
   wherein if no object in the object pool is reserved for the first thread, the means in (4) creates a new object, the means in (5) reserves the new object for the first thread, the means in (6) adds the new object to the object pool, and the means in (7) returns the new object in the object pool to the first thread.

11. A method for allocating an object oriented object from an object pool to a first thread of execution in a computer system, the method comprising the steps of:
   (1) if there is an object in the object pool that is reserved for the first thread, allocating the reserved object to the first thread;
   (2) if there is not an object in the object pool that is reserved for the first thread, performing the steps of:
      (2A) creating a new object;
      (2B) reserving the new object for the first thread;
      (2C) adding the new object to the object pool; and
      (2D) returning the new object in the object pool to the first thread.

12. The method of claim 11 wherein step (2) is performed only if there is no object in the object pool that is reserved for a dead thread.

13. The method of claim 12 wherein the object pool is locked to prevent other threads from accessing the object pool when the first thread determines whether there is an object in the object pool that is reserved for a dead thread.

14. The method of claim 12 wherein if there is an object in the object pool that is reserved for a dead thread, the method performs the steps of:

(3) reserving for the first thread the object that is reserved for the dead thread; and
   (4) returning the object reserved in step (3).

15. A method for allocating an object oriented object from an object pool to a first thread of execution in a computer system, the method comprising the steps of:
   (1) providing an object pool that contains at least one object reserved for a first thread of execution and at least one object reserved for a second thread of execution;
   (2) when the first thread requests an object from the object pool, allocating an object reserved for the first thread to the first thread;
   (3) when the second thread requests an object from the object pool, allocating an object reserved for the second thread to the second thread;
   (4) when a third thread requests an object from the object pool, performing the steps of:
      (4A) creating a new object;
      (4B) reserving the new object for the third thread;
      (4C) adding the new object to the object pool; and
      (4D) returning the new object in the object pool to the third thread.

16. A program product comprising:
   (A) an object allocation mechanism that allocates an object oriented object to a software application that is executed by a first thread of execution, wherein the object allocation mechanism (1) determines whether there is an object in an object pool that is reserved for the first thread, and if so, allocates the reserved object to the first thread; (2) if there is no object in the object pool that is reserved for the first thread, the object allocation mechanism creates a new object, reserves the new object for the first thread, adds the new object to the object pool, and returns the new object in the object pool to the first thread; and
   (B) signal bearing media bearing the object allocation mechanism.

17. The program product of claim 16 wherein the signal bearing media comprises recordable media.

18. The program product of claim 16 wherein the signal bearing media comprises transmission media.

19. The program product of claim 16 wherein step (2) is performed only if there is no object in the object pool that is reserved for a dead thread.

20. The program product of claim 19 wherein the object allocation mechanism locks the object pool to prevent other threads from accessing the object pool when the first thread determines whether there is an object in the object pool that is reserved for a dead thread.

21. The program product of claim 19 wherein if there is an object in the object pool that is reserved for a dead thread, the object allocation mechanism performs the steps of:
   (3) reserving for the first thread the object that is reserved for the dead thread; and
   (4) returning the object reserved in step (3).

* * * * *